May 24, 1932.    R. GUNN    1,860,285

CONTROL APPARATUS

Filed Dec. 23, 1929    3 Sheets-Sheet 1

INVENTOR.
Ross Gunn,
BY Harold Todd
ATTORNEY.

May 24, 1932.  R. GUNN  1,860,285
CONTROL APPARATUS
Filed Dec. 23, 1929  3 Sheets-Sheet 2

INVENTOR.
Ross Gunn,
BY
ATTORNEY.

May 24, 1932.  R. GUNN  1,860,285
CONTROL APPARATUS
Filed Dec. 23, 1929  3 Sheets-Sheet 3
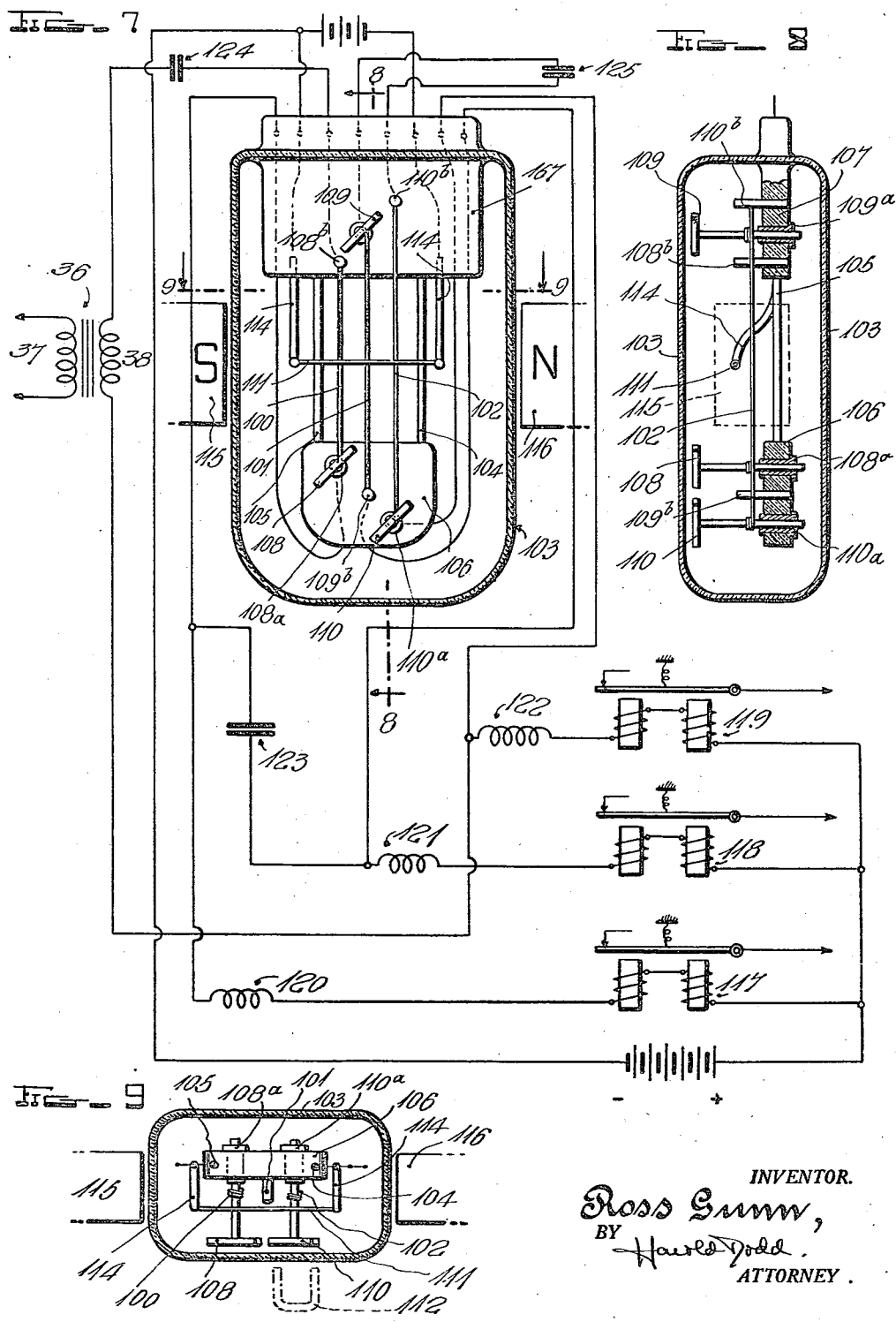
INVENTOR.
Ross Gunn,
BY Harold Todd.
ATTORNEY.

Patented May 24, 1932

1,860,285

UNITED STATES PATENT OFFICE

ROSS GUNN, OF WASHINGTON, DISTRICT OF COLUMBIA

CONTROL APPARATUS

Application filed December 23, 1929. Serial No. 416,164.

My invention relates broadly to control apparatus and more particularly to a system whereby the electrical operation of certain apparatus may be selectively controlled from a remote source over a single communication channel by means of selected harmonic potentials applied thereto.

One of the objects of my invention is to provide a simplified construction of apparatus for use in the remote control of electrical circuits by the transmission of control signals of selected frequencies.

Another object of my invention is to provide an improved construction of indicator apparatus which may be adapted among other applications for navigation purposes wherein a positive indication as to the course to be followed may be given by means of an indicator movable over a scale without depending upon a vibratile, visible reed, as heretofore employed in the art.

A further object of my invention is to provide an indicating apparatus of high sensitivity for navigation purposes wherein the operation of a movable indicator with respect to a scale is controlled by the change in condition of an electron stream in the control circuit at the receiver according to the frequency modulation of the incoming signaling energy.

A still further object of my invention is to provide a hot cathode apparatus having vibratory means controllable by the frequency of the received energy in an electrical system for actuating selected control circuits depending upon the frequency of the received signaling energy.

Figure 1:
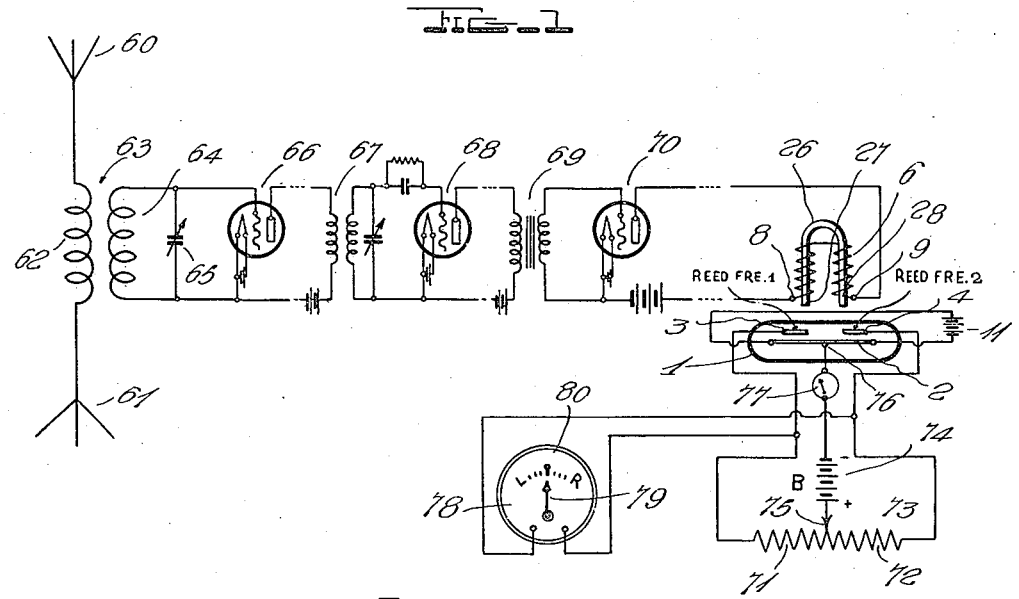
Figure 2:
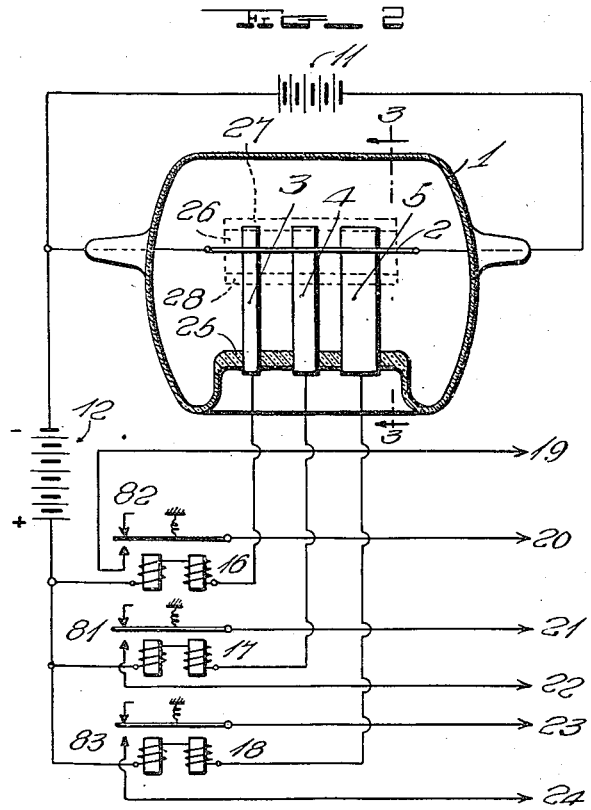
Figure 3:
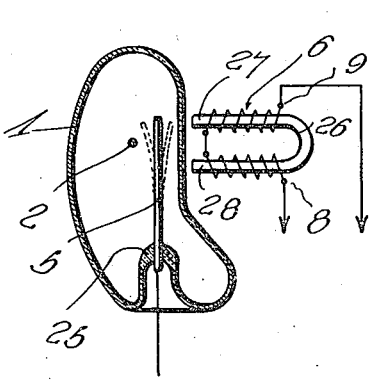
Figure 4:
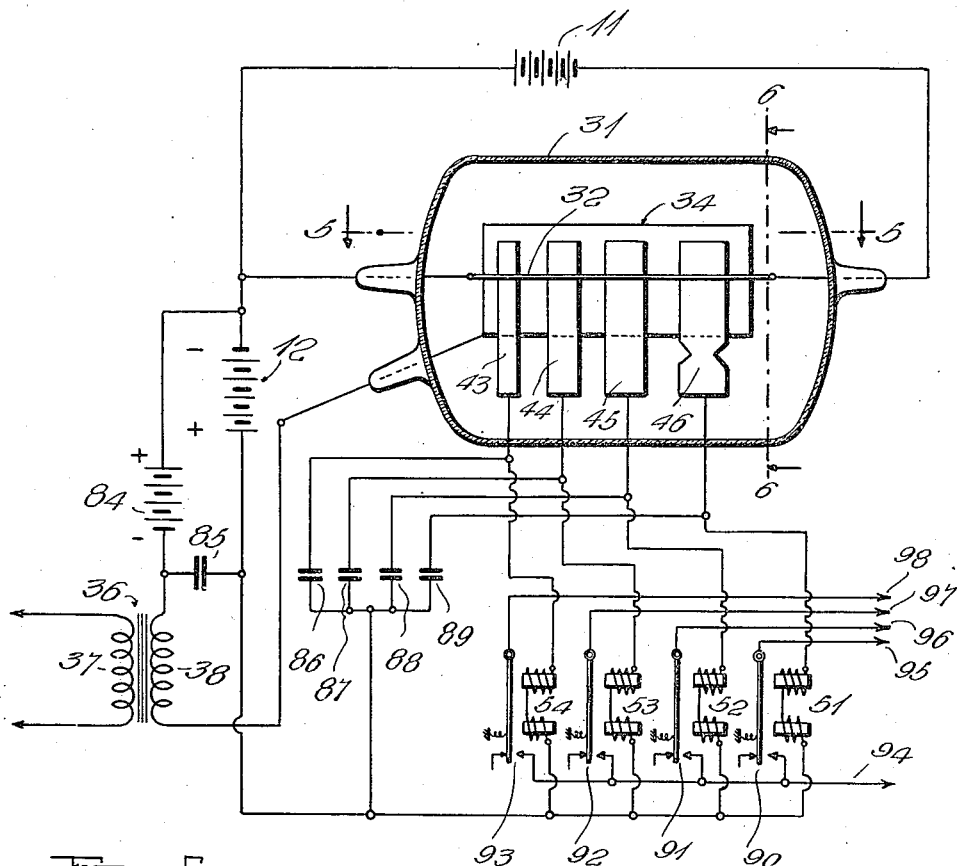
Figure 6:
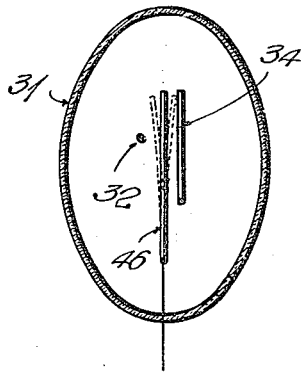
Figure 5:
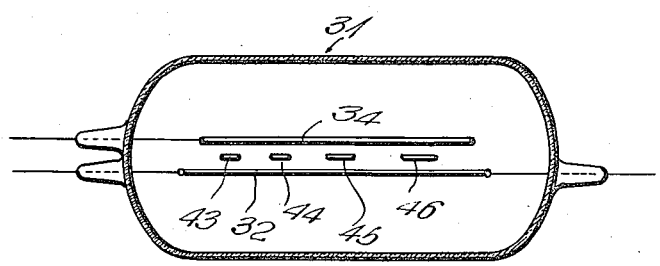

Other and further objects of my invention reside in the construction of the harmonic control apparatus described more fully in the specification hereinafter following by reference to the accompanying drawings, in which:

Figure 1 diagrammatically illustrates a circuit arrangement of the control apparatus of my invention; Fig. 2 is a diagrammatic view of the control circuits and the harmonic selection apparatus of my invention with the enclosing vessel of the apparatus shown in longitudinal cross-section; Fig. 3 is a lateral cross-sectional view taken through the harmonic control apparatus of Fig. 2 on line 3—3 thereof; Fig. 4 shows a modified arrangement of apparatus and system of control circuits embodying my invention; Fig. 5 is a longitudinal cross-sectional view through the control apparatus on line 5—5 of Fig. 4; Fig. 6 is a lateral cross-sectional view through the apparatus of Fig. 4 on line 6—6 thereof; Fig. 7 diagrammatically illustrates a further modified form of the control apparatus of my invention; Fig. 8 is a cross-sectional view through the apparatus of Fig. 7 substantially on line 8—8 thereof; and Fig. 9 is a lateral cross-sectional view through the control apparatus shown in Fig. 7 on line 9—9 thereof.

In the embodiment of the invention illustrated herein, I have shown the circuits of my invention applied to an indicator system for the guiding of aircraft, in which receiving circuits are provided to respond to transmitted energy which may be modulated at differing audio frequency notes on beams of radiant energy propagated in different directions. The receiving circuit aboard the aircraft responds to the energy transmitted directionally and modulated at different audio frequency notes and when the aircraft shifts off a predetermined course of flight, energy modulated at one audio frequency note may be received at greater amplitude than energy modulated at a different audio frequency note. I provide a hot cathode apparatus in which a multiplicity of vibratile reeds, each carrying a magnetic armature thereon or being constituted of magnetic material, are arranged adjacent an electron emitting body. The reeds are arranged to be magnetically actuated by a magnetic control member which operates in accordance with the audio frequency modulations of the received signaling energy and when the frequency of the incoming signaling corresponds to the frequency of one of the vibrating reeds, that particular reed will be selected and set into vibration. I provide a circuit to an electrically controlled device between the hot cathode and the several vibratory reeds which device may be selected for operation as the gap extending between the reed and the hot cathode becomes shorter and passes a greater current through the electron stream between the cathode and reed thus selected. As the frequency of the incoming signaling energy changes the vibratory motion of one reed will cease and the vibratory movement of another reed of a frequency corresponding to the frequency of the new signaling energy will be initiated and the control device in circuit with that reed thereby actuated.

The control device may take the form of a meter having an indicator movable over a calibrated scale to indicate to the pilot deviations from a predetermined course, in which event a balancing circuit is provided so that when the signal receiving circuit equally receives energy modulated at both of the transmitted frequencies the indicator on the indicating meter will remain in a central position, indicating to the pilot that the plane is following a predetermined course. In lieu of a magnetic control system, I may provide an electrostatically controlled hot cathode apparatus in which the electrostatic forces derived from incoming signaling energy are applied across the vibratory reed members of different frequencies and the cathode or properly charged plate electrode. The reeds corresponding in frequency to the applied electrostatic impulses are selectively set into vibration. The reeds are independently connected in control circuits and include a control device therein which is actuated when the current increases in the circuit which includes the reed which is set into vibration. Vibratory movement of a reed adjacent the hot cathode shortens the gap between the reed and the hot cathode and increases the amplitude of the flow in the control circuit, thus actuating the control device in the circuit.

I have illustrated the hot cathode apparatus of my invention as including different numbers of reeds which may operate on different frequencies, and it will be understood that various numbers of reeds may be assembled in the manner set forth in the diagrams for actuating any one of a multiplicity of different control circuits.

Referring to the drawings in detail, Fig. 1 illustrates a receiving circuit employing the antenna 60 and counterpoise 61 which connect to the primary winding 62 of transformer system 63, having secondary winding 64 coupled thereto and suitably tuned over the range for which the receiving circuits are intended to operate by condenser 65. The receiver may include any desired number of stages of radio frequency amplification which I have represented by the electron tube 66. The final stage of radio frequency amplification has its output circuit coupled through transformer system 67 with the input circuit of the electron tube detector 68. Any suitable number of stages of audio frequency amplification may be employed, the final stage of which I have shown at 70 connected through transformer system 69. The output circuit of the final stage of audio frequency amplification includes the polarized electromagnet 26 having opposite pole pieces 27 and 28 with windings 6 disposed thereon and terminating at 8 and 9 and connected in the output circuit of the audio frequency amplification system. The electromagnet is positioned adjacent the hot cathode apparatus which I have illustrated as enclosed in the evacuated vessel 1 having a hot filament 2 extending therethrough and heated by a suitable source of potential such as battery 11 for emitting electrons. In the embodiment of the invention illustrated in Fig. 1, I have shown two independent reeds 3 and 4 each having different frequency characteristics disposed adjacent the hot cathode 2 and in a position to be acted upon by the electromagnet 26. For purposes of more clearly illustrating my invention I have shown the electromagnet 26 rotated through a distance of 90° from its normal position and it will be understood that the electromagnet operates upon all of the reeds within the evacuated vessel 1. In the embodiment of the invention shown in Fig. 1, a balanced circuit in the form of a Wheatstone bridge is connected to the hot cathode and to the vibratory reeds 3 and 4. The Wheatstone bridge includes arms 71 and 72 of the resistance 73 and the resistance of the gap between reed 4 and hot cathode 2, and the gap between reed 3 and hot cathode 2. A source of potential 74 connects between an intermediate point 75 on resistance 73 with the hot cathode 2 as indicated at 76, including the series connected monitor meter 77. Under normal conditions this circuit is balanced when reeds 3 and 4 are both stationary or are both vibrated mechanically at equal amplitudes. The direct current distribution through both arms of the Wheatstone bridge is then the same. The current flow through the balancing circuit will be normally indicated by meter 77. The change in current flow through the different arms of the Wheatstone bridge circuit will be indicated by meter 78 having indicator 79 moving over scale 80. That is, if vibratory reed 3 is set into vibration a greater current flow will occur through resistance branch 71, the gap between reed 3 and hot cathode 2, monitor meter 77, battery 74 and tap 75 on resistance 73 than will occur in the other branch of the Wheatstone circuit. This difference will result in movement of indicator 79, of meter 78 over scale 80 in a counter-clockwise direction. On the other hand, should vibratory reed 4 be set into vibration and shorten the gap between reed 4 and hot cathode 2, the current distribution through the opposite side of the Wheatstone bridge circuit will be greater and indicator 79 will tend to move to the right or in a clockwise direction over scale 80. The system of my invention is highly sensitive in that current changes are brought about by shortening the electron stream gap within the hot cathode apparatus in accordance with any change in amplitude of the signal receiving circuits due to shift of the aircraft from a predetermined course.

It will be understood that the direct current components which are caused to flow in the control circuits are depended upon for operating the several relays. While the vibration of any one of the reeds serves to set up alternating current in the bridge and associated circuits, these alternating current components will not operate the indicators for the indicators are direct current instruments. A reed or other mechanical oscillating system arranged adjacent an electron emitting surface and maintained at such a potential, the electron current which flows to the reed will change the average space current when vibrated. The change in space current will be approximately sinusoidal and of the same frequency as the frequency of the reed, but in addition to this sinusoidal component, there is always a change of direct current or zero frequency component. This increase in steady current arising from the vibration of the reed is the component useful in operating the direct current indicators, relays, etc., and arises from the fact that the resistance between the reed or other mechanical oscillator and the electron emitting surface is not a linear function of the displacement, that is to say, a certain deflection of the reed from its equilibrium position toward the cathode increases the current flowing to it more than the decrease of current which is produced when the reed is deflected the same distance away from the cathode.

In Fig. 2 I have illustrated three tuned reeds at 3, 4 and 5, securely anchored at the ends thereof at 25 within the evacuated vessel 1 in a position free for vibratory movement under control of the electromagnetic system 26. I provide separate external circuits between battery 12 which connects to the cathode 2 and electrical control devices 16, 17 and 18, which connect respectively to the differently tuned reeds 3, 4 and 5. The electromagnet 26 is arranged in juxtaposition to the reeds which are made up in part at least of magnetic material in such a manner that alternating currents through the winding 6 whose frequencies correspond to the frequency of the tuned reeds 3, 4 or 5 will set the appropriate reed in vibration in a manner analogous to the vibration produced in a telephone diaphragm. When the impressed frequency of a reed corresponds to its natural frequency considerable amplitude of vibration is produced, which changes the mean spacing between the hot cathode 2 and the reeds 3, 4 or 5. The internal impedance of a vacuum tube changes very rapidly with the spacing of the elements, and the change in impedance is a non-linear function of the spacing; thus if the reed vibrates about its mean position, the current as we have seen above will increase more as the reed is deflected toward the hot filament 2 than it will decrease as it moves away from its mean position. Thus a vibrating reed will produce a marked increase in the direct current flowing to the reed which itself serves as a plate structure. Use is made of this fact in each of the control circuits. The filament 2 is maintained hot by a suitable battery 11 and emits electrons which are attracted to the reeds 3, 4 and 5 by means of the accelerating battery 12. The current to each reed is passed through the control device or relays 16, 17 and 18. These relays are so adjusted that the normal current flowing to the reeds when they are not vibrating is balanced out by proper adjustment of the relay. When a signal is impressed on the reed by means of the electromagnet 26, the reed which vibrates causes an increase in the direct current through the appropriate relay and the circuit is closed. For example, if an alternating current is impressed on the electromagnet 26 of a frequency corresponding to the natural period of a reed 4, this vibration changes the net plate current operating the relay 17 and closing the contacts 81 of the circuit leading to 21 and 22.

Similarly, control relay 16 has an armature and contact system 82 controlling a circuit connected to terminals 19 and 20. Relay 18 has contact system 83 controlling a circuit connected by leads 23 and 24. It is to be noted that with this system the polarization of the system is accomplished by means of a permanent magnet 26. In certain cases it may be desirable to omit this polarizing magnet, in which case the natural frequency of the reed must be twice that of the frequency of the energy utilized to operate the reed.

In lieu of the electromagnetic operation of the several tuned reeds I may employ an arrangement of hot cathode apparatus utilizing electrostatic principles of operation as illustrated in Figs. 4, 5 and 6. The apparatus is enclosed in an evacuated vessel 31 and includes a hot filament 32 energized by battery 11. The reeds numbered 43, 44, 45 and 46, made of any suitable material, are arranged in juxtaposition to the cathode in such a manner that when they vibrate they will produce changes of current through the relays 51, 52, 53, and 54. With this system a plate 34 is arranged in the manner shown and the periodic exciting forces are applied to the reed by varying the electrostatic potential between one of the reeds and the plate 34. It is to be noted that the plate 34 need not collect electrons emitted by the filament 32, and in general will be kept negative with respect to the filament by a battery 84. This requirement is not stringent, however, and under special conditions 34 may collect some of the current. The exciting potentials are applied to the system through the transformer 36 having primary and secondary windings 37 and 38 and the electrostatic forces set up in the region between the plate 34 and any reed 43, 44, 45 and 46 will produce periodic forces on the reed and if the forces are of the correct frequency, the reeds will be set in vibration. The essential difference of this arrangement from the system previously described lies in the fact that the vibrations are set up by electrostatic forces rather than magnetic forces. It is to be understood that the reeds 3, 4 and 5 or 43, 44, 45 and 46 will be tuned to different frequencies and each reed will respond only to the impressed frequencies corresponding to its own natural frequency.

The battery 12 provides the source of energy which is released between selected reeds and the cathode 32 for actuating any one of the relays 51, 52, 53 or 54. Condenser 85 connects between the terminals of opposite polarity of batteries 12 and 84. I provide condensers 86, 87, 88 and 89 between vibratory means 43, 44, 45 and 46, and the opposite sides of the control devices. Each of the control devices or relays 51, 52, 53 and 54 are provided with armatures and contact systems 90, 91, 92 and 93 which respectively control circuits 94—95, 94—96, 94—97, and 94—98. Any number of control circuits may be provided.

By virtue of the change in condition of the indicating apparatus or control device which may be brought about by a slight change in the gap between the hot cathode and the vibratory reeds, extremely accurate indications may be given of all deviations in the signal energy from one frequency to another.

In Fig. 7, I have shown an arrangement of electro-dynamic control apparatus wherein a multiplicity of mechanically tuned strings 100, 101, and 102 are mounted under tension within the evacuated vessel 103 and are supported upon a frame 104—105 having insulated head 106 supported from the glass press 107. The tension of the strings 100, 101 and 102 is adjustable by rotatable key devices 108, 109 and 110, respectively. The keys frictionally engage bushing members 110a, 108a and 109a secured in the insulating head 106 and glass press 107, respectively. In order that adjustment of the strings 100, 101 and 102 may be made from time to time, the heads of the pins 108, 109 and 110 are formed in the space of bar magnets which may be twisted under the influence of an exterior magnet which I have represented at 112 in Fig. 9 to thereby tighten the vibratory strings which are stretched between each of the keys and the pegs 108b, 109b and 110b, respectively. The cathode is shown at 111 supported by suitable means such as rods 114 from the glass press 107. The magnetic field which surrounds the envelope of the tube 103, and which in combination with the current flowing through the strings produces the periodic forces has pole pieces represented at 115 and 116. The input or control circuit is shown in a manner similar to the arrangement of Fig. 4 where the primary winding 37 of audio frequency transformer 36 connects to the output of any audio frequency system with secondary winding 38 connected between the several control relays 117, 118 and 119 in series with the several tuned strings 100, 101 and 102. In order to exclude alternating currents from the circuit including the strings, I provide choke coils 120, 121 and 122 therein and a by-pass condenser 123 associated with the circuits thereof. By-pass condensers 123, 124 and 125 are also provided in such manner that the impressed frequency components circulate easily through the string circuits but do not interfere with the operation of the direct current control circuits. The audio frequency components of the signaling energy is thus passed through all of the strings of the tuned system. The initial currents which are set up in the closed circuits can be balanced out by any suitable method such as a bridge. However when signaling energy of a frequency corresponding to the natural frequency of any one of the tuned strings is received, the tuned string of corresponding frequency is set into vibration. Inasmuch as current can pass through the tuned strings a field is set up which acts upon the space current path established by the approach of a tuned string toward the heated cathode, thereby increasing the current in the selected circuit and operating the associated relay which connects in circuit therewith. I have found the string system better for high frequency operation while the vibratory reeds are better for low frequency operation if space considerations are found to be important.

Under special conditions such as would occur at high potentials it is sometimes desirable to place a hot cathode on each side of tuned mechanical systems and connect the two cathodes suitably to the associated apparatus. I desire it to be understood that such modified forms fall within the scope of this invention.

While I have described my invention in certain preferred embodiments, I desire that it be understood that modifications may be made and that no limitations upon my invention are intended other than are imposed by the scope of the appended claims.

What I claim and desire to secure by Letters Patent of the United States is as follows:

1. A hot cathode apparatus including an electron emitting body and a multiplicity of reeds tuned to different frequencies and located adjacent thereto, an electromagnetic actuating device responsive to different frequencies disposed in alignment with said tuned reeds for initiating and maintaining said reeds in a condition of vibration when said electromagnetic device is excited at a frequency corresponding to the frequency of any one of said reeds, and external circuits extending from each of said reeds to a control device, a source of potential, and to said electron emitting body for the actuation of the control devices therein when energy of a frequency corresponding to said reed is impressed upon said electromagnetic actuating device.

2. A hot cathode apparatus including an electron emitting body and a multiplicity of vibratory reeds each tuned to a different frequency and mounted adjacent thereto, an electromagnetic device responsive to a range of frequencies including the frequencies of said vibratory reeds, said electromagnetic device being aligned with said reeds for subjecting a selected reed to vibratory movement in accordance with the frequency at which said electromagnetic device is excited, and independent control circuits connected to said reeds for selective operation by the passage of current between said reeds and said electron emitting body upon receipt of signaling energy corresponding to the frequency of a selected reed.

3. In a control apparatus, the combination of a plurality of reeds each tuned to different frequencies, a hot cathode disposed adjacent said reeds, external circuits including individual reeds, a source of potential and said hot cathode, a control device in each of said circuits and means for subjecting selected reeds to vibratory movement for producing a change in current through a selected control device.

4. A control apparatus comprising in combination a plurality of reeds each tuned to different frequencies, a hot cathode disposed adjacent said reeds, and a plurality of independent control circuits each including a control device and individually connected to said reeds and connected to a source of potential and to said cathode, and electromagnetic means for imparting vibratory movement to a selected one of said reeds for producing a change in current in the control circuit connected thereto for actuating the control device therein.

5. In a control apparatus the combination of an enclosing vessel, a multiplicity of vibratory reeds each having different frequency characteristics and mounted within said vessel, a hot cathode in said vessel disposed adjacent said reeds, individual control circuits connected to each of said reeds and series connected to a control device, a source of potential and means for subjecting a selected one of said reeds to vibratory movement for changing the current distribution through the control circuit connected thereto and actuating the control device therein.

6. In a control apparatus, a vessel, an electron emitting body disposed within said vessel, a multiplicity of vibratory electrodes disposed adjacent said electron emitting body in said vessel each having different frequency characteristics, external circuits each connected to said electron emitting body, a source of potential, and to each of said electrodes separately including a control device connected with the individual electrodes, for normally establishing an equalized current distribution in all of said external circuits and means for subjecting a selected one of said electrodes to vibratory movement for changing the current distribution through the external circuit connected therewith and actuating the control device connected therewith.

7. In a control system, an enclosing vessel, an electron emitting body positioned within said vessel, a plurality of vibratory electrodes each having different frequency characteristics mounted adjacent the electron emitting body within said vessel, a source of potential, a plurality of external circuits corresponding in number to the number of said vibratory electrodes, circuit connections between said electron emitting body and said source of potential and each of said vibratory electrodes, a control device in each of said connections and normally subjected to substantially equal current distribution, and means for subjecting a selected electrode to vibratory movement for changing the current distribution in the external circuit connected thereto and actuating the control device therein.

8. In a control system, an evacuated vessel, an electron emitting body in said vessel, a multiplicity of vibratory electrodes disposed in said vessel each having different frequency characteristics, means for resonating a selected one of said electrodes, and means connected in said circuit with said electron emitting body and said vibratory electrodes and responsive to current changes in the path between said electrodes and said electron emitting body.

9. In a control system, an evacuated vessel, an electron emitting body disposed in said vessel, a multiplicity of vibratory electrodes having different frequency characteristics and mounted in said vessel adjacent said electron emitting body, independent circuits including a source of potential connected between said electron emitting body and the individual vibratory electrodes in said vessel, a control device in each of said circuits, and means for subjecting a selected one of said electrodes to vibratory motion.

10. In a control system, an evacuated vessel, an electron emitting body within said vessel, a plurality of vibratory electrodes, each having different frequency characteristics, disposed adjacent said electron emitting body within said vessel, external circuits extending between said electron emitting body and each of said electrodes, a control device in each of said external circuits, means in said external circuits for impressing a positive potential upon each of said electrodes for establishing a current flow through said control devices and through the electron stream paths between said electron emitting body and said electrodes, and means for subjecting a selected electrode to vibratory movement for increasing the current distribution through the external circuit associated therewith and actuating the control device therein.

11. In a control system, an evacuated vessel, an electron emitting body within said vessel, a multiplicity of vibratory reeds each having different frequency characteristics, said reeds being adjacent said electron emitting body, means external to said vessel and operative by current of different frequency characteristics for initiating a selected reed into vibration, and means connected between said reeds and said electron emitting body for indicating the particular reed which is set into vibration and its amplitude.

12. In a control system, an evacuated vessel, an electron emitting body within said vessel, a plurality of vibratory electrodes each having different frequency characteristics and positioned adjacent said electron emitting body, electromagnetic means external to said vessel and operative over a variable range of frequencies for initiating into vibration a selected one of said vibratory electrodes, and an electrical control circuit within said electrodes and responsive to changes in the current distribution between said electron emitting body and said electrodes under conditions of vibratory movement of any one of said electrodes.

13. In a control apparatus, an evacuated vessel, an electron emitting body within said vessel, an electrode disposed adjacent said electron emitting body, a multiplicity of vibratory electrodes positioned intermediate said electron emitting body and the aforesaid electrode, said vibratory electrodes each having different frequency characteristics, a source of potential connected between said electron emitting body and each of said vibratory electrodes, independent control devices connected with each of said electrodes, and means for impressing electro-static charges of predetermined frequency characteristics between said electron emitting body and said vibratory electrodes for initiating into vibration a selected vibratory electrode corresponding to the frequency of the impressed electrostatic impulses for the selective operation of a control device.

14. In a control system, an evacuated vessel, an electron emitting body disposed within said vessel, an electrode disposed adjacent said electron emitting body, a multiplicity of vibratory electrodes each having different frequency characteristics and disposed between said electron emitting body and said electrode, individual circuits extending between said electron emitting body and each of said vibratory electrodes, means for impressing energy corresponding to the frequency of any one of said vibratory electrodes between said electron emitting body and said vibratory electrodes, said circuits including a source of potential, and a control device individual to each of said electrodes whereby a selected control device is actuated by increasing current through the path including that vibratory electrode which is initiated into movement by excitation of said means at a frequency corresponding to the natural frequency of said vibratory electrode.

15. In a control system, an evacuated vessel, an electron emitting body within said vessel, a multiplicity of vibratory electrodes each having a different vibratory frequency, said electrodes being disposed adjacent said electron emitting body, a Wheatstone bridge circuit including resistance in two of the adjacent arms thereof and including the electron stream gaps between said electrodes and said electron emitting body as the other arms thereof, an indicating device connected across said last mentioned arms, and means for initiating into vibration a selected one of said electrodes for disturbing the normally balanced condition of said Wheatstone bridge circuit and indicating the extent of unbalance thereof.

16. In a control system, an electron discharge device including a vessel, an electron emitting body therein, and a multiplicity of vibratory electrodes each having different frequency characteristics within a predetermined range of frequencies, a Wheatstone bridge circuit having resistors in adjacent arms thereof and having the opposite arms thereof constituted by the electron stream gaps between each of said electrodes and said electron emitting body, a source of potential for said Wheatstone bridge and an indicator connected across the last mentioned arms of said Wheatstone bridge for indicating a condition of unbalance of said Wheatstone bridge circuit when selected vibratory electrodes are set into a state of vibration.

17. In an electron tube device, a cathode, a multiplicity of vibrating mechanical elements each responsive to different frequencies, said elements being disposed adjacent said cathode, means for selectively exciting said vibrating mechanical elements, and output circuits connected to each vibrating element and to the cathode.

18. A control apparatus comprising an electron tube, a heated cathode within said tube, a multiplicity of mechanically tuned members each independently tensioned and supported within said electron tube in predetermined relation to said cathode, means for subjecting said tensioned members to a constant magnetic field, a circuit for subjecting said tensioned members to the passage of a variable electrical current, and output means disposed in circuit between said cathode and each of said tensioned members and operative under control of the current passing through the electron streams between said cathode and each of said tensioned members.

19. In an electron tube apparatus, an enclosing vessel, a heated cathode within said vessel, a plurality of tuned tensioned members mounted within said vessel adjacent said heated cathode, control devices connected in circuit with each of said tensioned members and in circuit with a source of variable current, and a magnetic field threading said tensioned members and selectively reacting with the magnetic field established by the passage of current through each of said tensioned members under control of said source of variable current for controlling a selected one of said control devices.

20. In an electron tube apparatus, a vessel, a heated cathode enclosed within said vessel, a multiplicity of tensioned members each mechanically tuned to different frequencies, a control device connected in circuit with each of said tensioned members and in circuit with an exciting source of predetermined frequency characteristics, and a magnetic field threading said tensioned members and reacting with the field established around said tensioned members by the passage of current therethrough for selectively actuating said control devices.

21. In a cathode device, a cathode, a multiplicity of vibrating mechanical elements adjacent to selected portions of said cathode device, each of said elements having different frequency characteristics, means for electromagnetically exciting said mechanical elements into vibration, and output circuits connected to each vibrating element and to said cathode.

22. In a hot cathode device, a hot cathode, a multiplicity of vibrating mechanical elements each having different frequency characteristics, said elements being disposed adjacent said hot cathode device, means for exciting said mechanical elements, and control circuits connected to each vibrating element and to said cathode member.

23. In a hot cathode device, a hot cathode, a pair of tuned vibrating mechanical elements adjacent thereto, means for exciting each of said mechanical elements, bridge circuits electrically associated with said elements and with said cathode and an indicator connected with said bridge circuits for indicating the relative amplitude of vibration of said mechanical elements.

24. In a system for indicating the relative amplitudes of two alternating potentials of different frequency, in combination, a hot cathode device including a hot cathode member, a pair of mechanically vibratile elements disposed adjacent thereto, one of said vibratile elements being tuned to a predetermined frequency and the other vibratile element being tuned to a different predetermined frequency, output circuits connected to each of said elements and with said cathode member and an indicator connected with said output circuits for indicating the relative amplitudes of vibration of said vibratile elements.

ROSS GUNN.